United States Patent [19]

Fields, Jr.

[11] Patent Number: 4,685,005
[45] Date of Patent: Aug. 4, 1987

[54] TWO-MODULE-READ, READ-AFTER-WRITE, BI-DIRECTIONAL TAPE DRIVE

[75] Inventor: Davis S. Fields, Jr., Tucson, Ariz.

[73] Assignee: International Business Machines Corporation, Armonk, N.Y.

[21] Appl. No.: 514,994

[22] Filed: Jul. 18, 1983

[51] Int. Cl.$^4$ .............. G11B 5/09; G11B 15/12; G11B 5/187
[52] U.S. Cl. .................. 360/53; 360/63; 360/121
[58] Field of Search ............ 360/53, 62, 63, 121

[56] References Cited

U.S. PATENT DOCUMENTS

| | | | |
|---|---|---|---|
| 3,088,101 | 4/1963 | Schrimpt | 360/48 |
| 3,249,928 | 5/1966 | Curris et al. | 360/53 |
| 3,774,154 | 11/1973 | Devore et al. | 360/53 |
| 3,813,690 | 5/1974 | Oka | 360/90 |
| 3,942,190 | 3/1976 | Detwiler | 360/63 |
| 4,003,089 | 1/1977 | Maurer | 360/63 |

Primary Examiner—Vincent P. Canney
Attorney, Agent, or Firm—Francis A. Sirr

[57] ABSTRACT

A digital tape drive wherein tape is written, and a read-after-write operation is immediately performed to check the integrity of the write operation, for either direction of tape movement. The tape contains a plurality of parallel data tracks. Two read/write head modules span the entire tape. The read and write gaps of each module are alternately spaced across the width of the tape, such that the write gaps of one module are aligned with the read gaps of the other module. When one module is selected for writing, as a function of the direction of tape movement, the other module is selected to read-after-write check the first module's written data. One module writes odd-track data during one direction of tape movement, and reads even-track data during the opposite direction of tape movement; as the other module writes even-track data during said opposite movement direction, and reads odd-track data during said one movement direction. Common read and write eletronic circuits are switched between the two modules, since each module is using only one of its read and write gap multiples at any given time.

13 Claims, 3 Drawing Figures

TWO-MODULE-READ, READ-AFTER-WRITE, BI-DIRECTIONAL TAPE DRIVE

TECHNICAL FIELD

This invention relates to the field of magnetic recording, and more specifically to the field of multiple channel recording wherein magnetic media carries multiple, parallel data channels, certain (odd) tracks of which are operable during one direction of media movement and other (even) tracks of which are operable during the opposite direction of media movement.

BACKGROUND OF THE INVENTION

Bi-directional tape drives, both digital and analog, are well known. The state-of-the-art in digital recording is that digital data should be read immediately after being written, in order to insure that the data has been written correctly. For example, a write-head-module is placed in front of a read-head-module, in the direction of tape movement. These two head modules are preferably formed as a single physical unit; thus, the read and write gaps are closely spaced. This arrangement, however, requires two write modules and two read modules for a bi-directional tape drive. One pair of head modules operate on the tape's odd-number tracks, and the other head module pair operate on the even-number tracks during the opposite direction of tape movement.

While a number of prior art arrangements of this type exist, U.S. Pat. No. 3,942,190 is cited as exemplary. In this device, one group of heads is operable during one direction of tape movement, and another group of heads operates during the opposite direction of tape movement. Since only one group of heads operates at a time, a head switching circuit allows a common amplifier to be used by the operative group of heads.

U.S. Pat. No. 3,813,690 provides a somewhat similar teaching.

SUMMARY OF THE INVENTION

The present invention provides a bi-directional media drive which does not require the complexity of head construction provided by the prior art, and yet, none of the function is eliminated.

More specifically, the present invention provides accessing of odd-number tracks during one direction of tape movement, and even-numbered tracks during the opposite direction of tape movement, while accomplishing read-after-write checking, but with a simplified head construction and arrangement.

This head construction and arrangement provides two head modules, each having one gap line which traverses all data tracks, both odd and even. Each module's gap line contains alternating write and read gaps, occupying a common line which extends transverse (i.e., perpendicular to) the direction of tape movement. The construction of the head preferably provides write-wide and read-narrow operation.

These two head modules are closely spaced, in the direction of tape movement, and in fact they are preferably formed as a single physical unit. The write gaps of one module are aligned, in the direction of tape movement, with the read gaps of the other module. Thus, one module is the write-module for say the even tracks, as the other module is the read-after-write module for the even tracks, and vice versa.

One set of write electronic circuits, and one set of read electronic circuits, are shared by the two modules, as a function of the direction of tape movement.

The foregoing and other features and advantages of the invention will be apparent from the following more particular description of preferred embodiments of the invention, as illustrated in the accompanying drawing.

THE INVENTION

Figure 1:
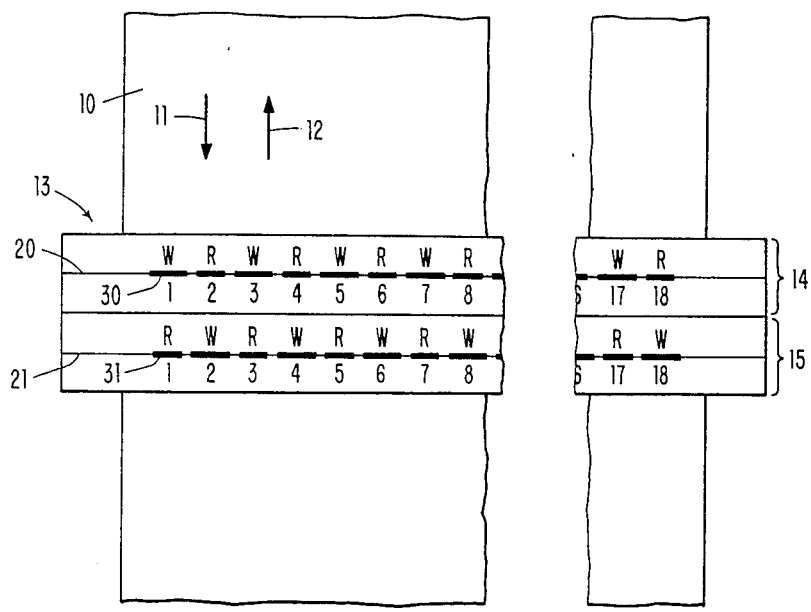
FIG. 1 is a top view of a length of magnetic tape, and its relationship to the head of the present invention.

The tape drive per se to be used in practicing the present invention can be of any well known configuration. Reel-to-reel and buffered tape drives are two well known drives, either of which is suitable.

The head to be used in the practice of the present invention can also take the form of any of a number of well known construction and arrangements. However, thin film construction is preferred. By the use of photolithographic, printed circuit techniques, it is possible to maximize use of the media's surface, since narrow, closely spaced, tracks can be written. Whatever type head is used in the practice of the present invention, the present invention provides the advantage that transversely adjacent head elements (i.e., head elements spaced in a direction normal to the direction of media movement) are not operative at the same time, thus minimizing the possibility of cross talk and the like.

In the preferred embodiment of a thin film head, the write element and the read element can both be inductive elements; however, it is preferred that the read element be a magnetoresistive (MR) element. It is also preferred that such MR read gaps be of the shunt biased type, well known to those of skill in the art.

Whatever the head construction chosen by those skilled in the art, it is preferred that the head construction implement the well known write-wide read-narrow format.

While the present invention is described in an environment where the read and write gaps are used in immediately alternating, odd/even fashion, the term alternating is intended to include other formats. For example, it is within the present invention to provide a format of 20 tracks across the width of the media, hereinafter called tape. One format, within the present invention, provides that tracks 1, 3, 5, 7, 9, 11, 13, 15, 17 and 19 are operative during forward tape movement, while tracks 2, 4, 6, 8, 10, 12, 14, 16 18 and 20 are operative during the opposite direction of tape movement. Another format, also within the present invention, provides for tracks 1, 5, 9, 13 and 17 to be operative during a first forward pass of the tape, with tracks 3, 7, 11, 15 and 19 being operative during a second forward pass. Of course, during the reverse pass, which separates the first and second forward passes, tracks 2, 6, 10, 14 and 18 are operative, and tracks 4, 8, 12, 16 and 20 are operative during the next reverse pass of the tape.

Other formats usable in the practice of the present invention will of course be evident to those of skill in the art, and are considered to be within the teaching of the present invention.

Reference numeral 10 designates a length of flexible magnetic recording tape of, for example ½ inch width, and of conventional chemical formulation. Arrow 11 designates the tape's forward movement direction, and arrow 12 designates the reverse direction. Magnetic read/write transducer or head 13 is made up of two modules 14 and 15 of generally identical construction. These two modules are mounted together to form a single physical unit. In this way, the transducing gaps of one module are not only closely spaced to the gaps of the other unit, but also, the module gaps are accurately aligned in the direction of tape movement.

In the exemplary head of FIG. 1, each module includes one gap line, 20 and 21, along which the individual gaps of each module are accurately located. As those skilled in the art will appreciate, it is essential that gap lines 20 and 21 be parallel, and that the head be mounted to the tape drive (not shown) in an accurate manner, such that gap lines 20 and 21 are perpendicular to the direction of tape movement 12, 13.

In order to simplify the showing of the present invention, only the tape drive's head is shown. It is contemplated, and it is a part of this disclosure, that head 13 forms a part of, and is mounted to, a tape drive of whatever form is chosen by those desiring to use the present invention.

Within the teachings of the present invention, head 13 includes alternating read/write gaps along the length of each of the gap lines 20, 21 which extend transverse to the direction of tape movement 11, 12.

In this exemplary embodiment, tape 11 is shown as having 18 tracks across its ½ inch width. As shown in FIG. 1, track "1" is at the left edge of the tape, and track "18" is at the right edge of the track. These tracks are for example 0.020 inch wide, as determined by the width of the head's write gaps. The tracks are written about 15% wider than the read gaps are able to read; i.e., the head's write track widths are 15% wider than are its read track widths. FIG. 1 shows the gaps identified as "1" through "18", as these gaps individually cooperate with an identically numbered tape track. FIG. 1 also identifies the eighteen individual read gaps as "R" and the eighteen write gaps as "W". Within the teachings of the present invention, the read gaps of one module are aligned, in the direction of tape movement, with the write gaps of the other module. Thus, as seen in FIG. 1, module 14's track-1 write gap 30 is aligned with module 15's track-1 read gap 31. Write gap 30 writes a 15% wider track-1, on tape 10, than is read by gap 31.

Figure 2:
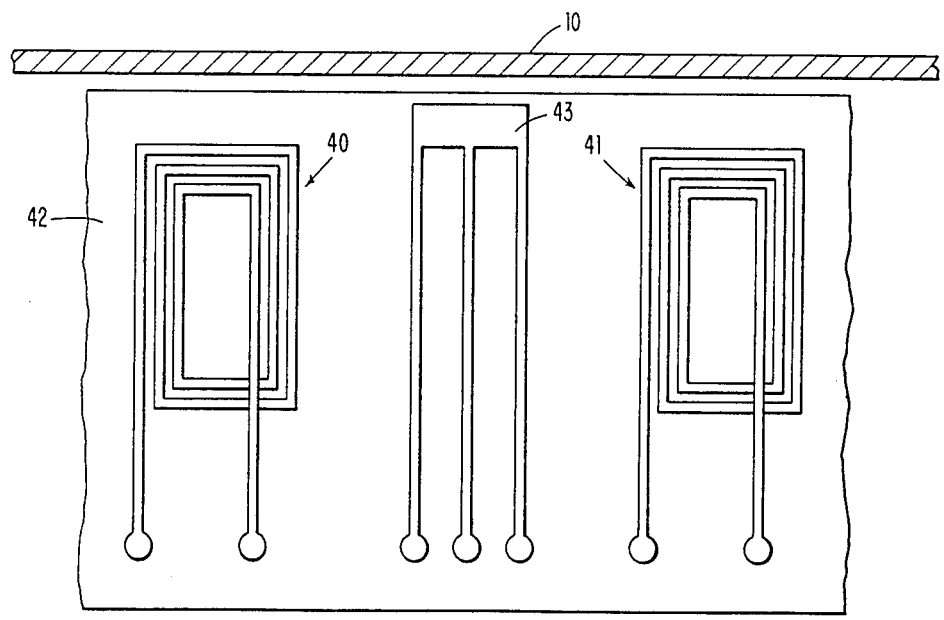
FIG. 2 shows a portion of the head of FIG. 1, as it would look when made using thin film techniques to manufacture the head.

As stated, the construction and arrangement of head 13 is not critical to the present invention. However, a thin film head is preferred. FIG. 2 shows a portion of such a thin film head. In this figure, two write coils 40 and 41 are shown deposited on ferrite substrate 42, with a shunt-biased magnetoresistive read element 43 deposited therebetween. A head in accordance with the present invention, and in accordance with the embodiment of FIG. 1, would have two modules, each module having nine such read elements, and nine such write elements.

Figure 3:
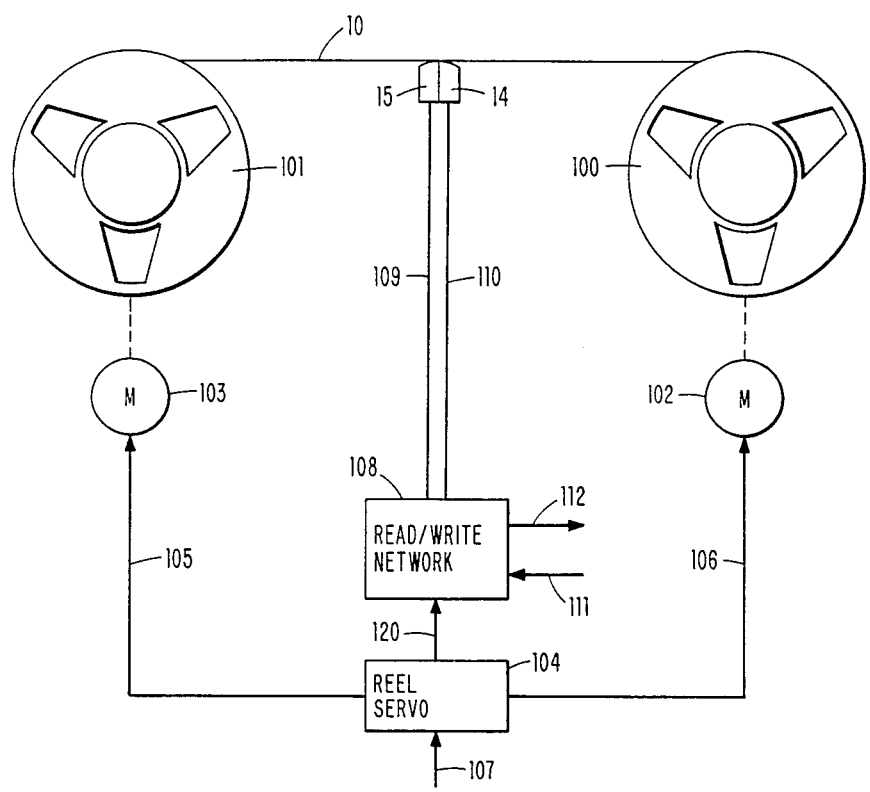
FIG. 3 shows an arrangement for switching the read/write electronic network as a function of the direction of tape movement.

FIG. 3 shows a reel-to-reel tape drive using the above-described constructions and arrangements. Since the details of many reel-to-reel tape drives are known, FIG. 3 is a simplified showing.

A pair of tape reels 100 and 101 store a length of tape 10. Each reel is capable of bi-directional rotation, as is controlled by motors 102 and 103. These motors are controlled by a reel servo network 104, by way of conductors 105 and 106, all under the command of input conductor 107.

The two aforesaid head modules 14, 15 have their read and write gap elements connected to read and write electronic network 108, by way of multiconductor buses 109 and 110. Network 108 accepts digital data to be written onto tape, by way of multiconductor bus 111; and digital data read from tape is supplied to a using system by way of multiconductor bus 112.

Buses 111 and 112, as well as the write portions and the read portions of network 108, are switched between the write and read gaps of head modules 14 and 15, in accordance with the direction of tape movement, as this direction is indicated to network 108 by the signal on conductor 120.

The details of FIG. 3 are not to be taken as a limitation on the present invention. Countless other tape drive configurations will be apparent to those skilled in the art for use with the present invention.

While the invention has been particularly shown and described with reference to preferred embodiments thereof, it will be understood by those skilled in the art that various changes in form and details may be made therein without departing from the spirit and scope of the invention.

I claim as my invention:

1. In a bi-directional media drive wherein data is written on certain odd-numbered tracks during one direction of media movement, and is written on certain even-numbered tracks during the opposite direction of media movement, and in which a read-after-write check is immediately performed on written data, the improvement comprising:
    two data-transducing head modules, each of which includes one transducing gap line extending normal to the direction of media movement, said modules being non-movable relative each other; and
    each gap line including alternating write and read gaps, the write gaps of one module being aligned in the direction of media movement with the read gaps of the other module.

2. The drive of claim 1 including means, responsive to the direction of media movement and to a write state of said media drive, for enabling certain write gaps of one module and the aligned read gaps of the other module during one direction of media movement, and for enabling other aligned write and read gaps during the other direction of media movement.

3. The drive of claim 2 wherein the drive is a magnetic tape drive, said media is magnetic tape, and said heads are magnetic heads.

4. The drive of claim 3 wherein said write gaps are wider than are said read gaps, said width parameter being measured generally normal to the direction of tape movement.

5. The drive of claim 2 including read electronic circuits and write electronic circuits, and switching means, controlled as a function of media movement, to connect said read and write circuits only to the read and write gaps which are operative for that direction of media movement.

6. The drive of claim 1 wherein said heads are thin film heads.

7. The drive of claim 6 wherein the read gap of said thin film heads are magnetoresistive.

8. The drive of claim 2 wherein said heads are thin film heads.

9. The drive of claim 8 wherein the read gap of said thin film heads are magnetoresistive.

10. The drive of claim 1 wherein all write gaps of one module are operative with all read gaps of the other module during on direction of tape movement.

11. The drive of claim 2 wherein all write gaps of one module are operative with all read gaps of the other module during one direction of tape movement.

12. The drive of claim 11 wherein said heads are thin film heads.

13. The drive of claim 12 wherein the read gap of said thin film heads are magnetoresistive, and wherein said heads provide wide-write, narrow-read.

* * * * *